Patented Sept. 2, 1947

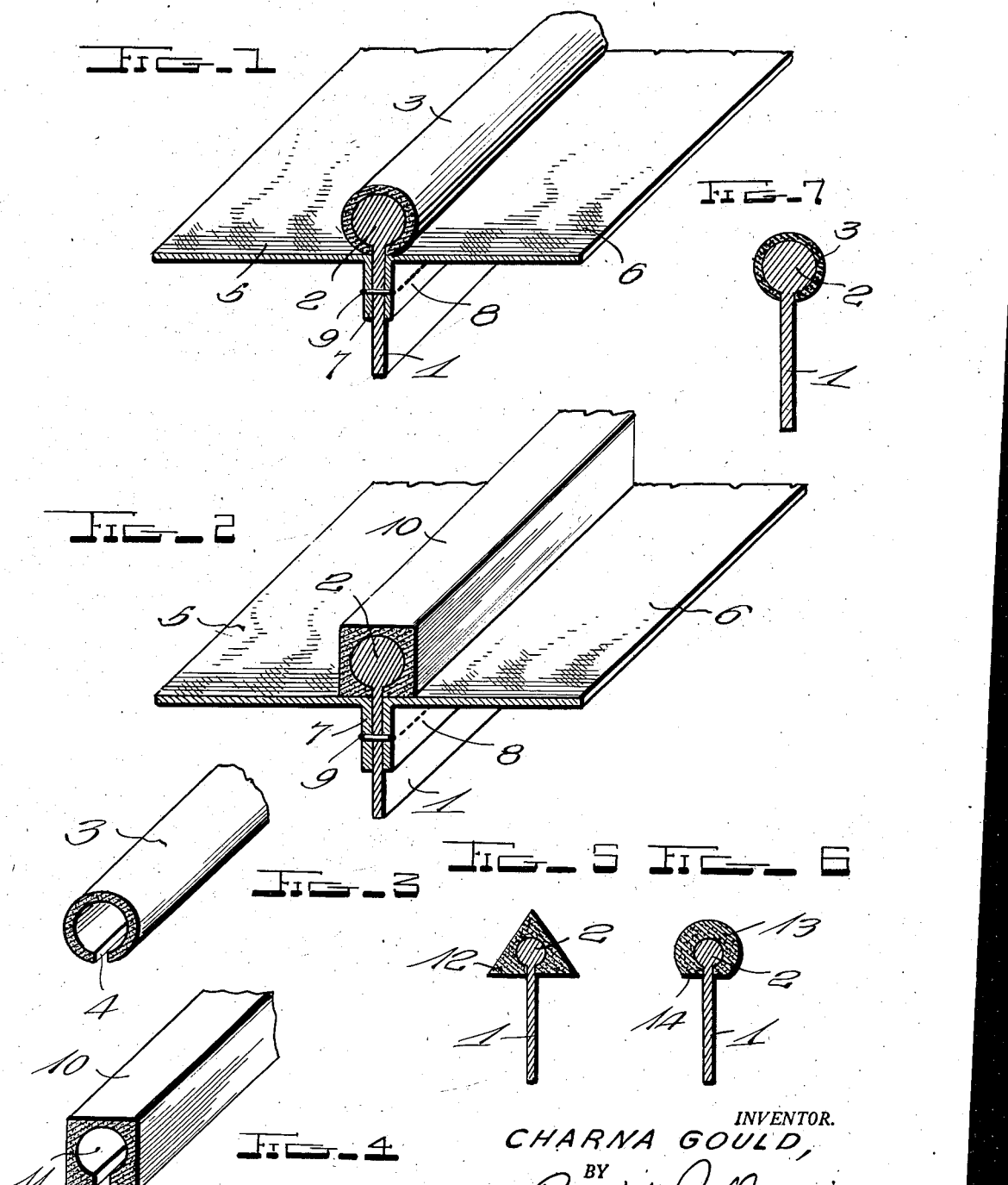

2,426,769

UNITED STATES PATENT OFFICE 2,426,769

PLASTIC PIPING

Charna Gould, New York, N. Y.

Application April 28, 1945, Serial No. 590,888

3 Claims. (Cl. 154—53.6)

The present invention relates to improvements in ornamentation and has reference more particularly to an ornamental covering for beaded tapes, such as are associated with articles of furniture; slip covers; wearing apparel; draperies, etc.

One of the important objects of the present invention resides in the novel manner in which a slotted plastic piping is fixedly attached to the enlarged beaded head of a tape without the use of any adhesive.

A further object of the present invention resides in the provision of a plastic piping for association with a beaded tape which not only is decorative but is also utilitarian in that it serves to protect the beaded portion against wear.

Another object is to provide a plastic piping that will be inexpensive, strong and durable and further capable of being readily and easily attached over the beaded portion of a tape.

Other objects and advantages of the present invention will become apparent from the accompanying drawing and following specification.

In the accompanying drawing forming a part of this specification and in which like reference characters designate corresponding parts throughout the several views:

Figure 1 is a perspective view showing the slotted tubular plastic piping enclosing the beaded portion of a tape, with the covered bead projecting outwardly of the outer face of two pieces of fabric between which the tape may be secured;

Figure 2 is a similar view showing the plastic piping as being of rectangular configuration in cross section;

Figure 3 is a perspective view of a portion of the slotted plastic piping;

Figure 4 is a similar view showing the rectangular shaped plastic piping;

Figures 5 and 6 show modifications of the cross sectional shape of the plastic piping attached to beaded tape, and Figure 7 is a cross sectional view through a beaded tape showing the slotted tubular plastic piping fitted on the beaded portion.

In the drawing, the numeral 1 designates a tape having an enlarged solid beaded head 2 formed on its outer edge, the beaded head being circular in cross section.

As shown in Figure 7, the beaded head 2 is completely encased by a circular plastic piping denoted by the numeral 3. Attention is now directed to Figure 3, wherein this circular or tubular plastic piping is formed with a longitudinal slit 4 along its bottom.

In applying or affixing the plastic piping to the beaded tape, plastic piping is molded around the beaded portion 2 by a suitable core through which the beaded tape is placed, and by shrinkage of the plastic as it cools, thus, the slotted plastic piping will become fixedly secured around the beaded head 2 without the use of an adhesive.

In forming the plastic piping, the plastic material, as it is forced through the extrusion head of a suitable extrusion machine, means may be provided for forming the slot 4 in the circular plastic piping and as this piping cools slightly, the beaded tape is caused to be inserted into the slotted piping and upon the complete cooling of the plastic piping, the same will tend to shrink and firmly grip the bead and the adjacent side faces of the tape 1.

In this manner, the plastic piping and the beaded tape will be practically inseparable.

If desired, either the beaded tape or the plastic piping may be elasticized to render the same more flexible.

The plastic piping where applied to the beaded tape will not only serve as a decorative covering for the beaded tape, but also serves as a protective covering for the bead against wear and distortion.

As shown in Figure 1, the plastic piping covered beaded tape may be secured between two pieces of fabric 5 and 6 by stitching the tape to the inturned edge portions, 7 and 8, of the pieces of the fabric as at 9, so that covered beaded portion 2 projects beyond the outer faces of the two pieces of fabric.

In Figures 2 and 4, a slotted plastic piping 10 that is rectangular in cross sectional design is illustrated. The core 11 of this rectangular shaped piping is circular in conformity to the circular shaped bead 2.

In Figure 5, the plastic piping 12 is triangular in cross section, while in Figure 6, the plastic piping 13 is substantially circular, the bottom portion being flat as indicated at 14.

Thus, the plastic piping may be of any suitable shape in cross section to harmonize with the article or material with which the beaded tape is associated. Also, the plastic piping may be of any suitable color.

A plastic piping of the above described character can be employed with beaded tape for ornamenting various articles of furniture, slip covers, wearing apparel, draperies, etc. Not only will the plastic piping serve as a decorative covering for the beaded tape, but will also protect the bead against wear.

While I have shown the preferred embodiment of my invention, it is to be understood that various changes in the size, shape and arrangement of parts may be resorted to without departing from the spirit of the invention and scope of the appended claims.

Having thus described my invention, what I claim is:

1. In combination with a tape having an integral bead formed on the outer edge thereof, a piping, slit along its bottom to receive the bead so that the bead is entirely confined within said piping, said piping being fixedly secured around the bead, the portion of the tape directly adjacent the bead being clamped between the side edges of the slit formed in the bottom of the piping.

2. In combination with a tape having an enlarged integral bead formed on the outer edge thereof, a plastic piping slit along its bottom, the plastic piping completely enclosing the bead and being shrunk thereon, the side edges of the slit being straight and in clamping engagement with the opposite sides of the tape directly adjacent the enlarged bead.

3. In combination with a tape having an enlarged integral bead formed on the outer edge thereof, a flexible plastic piping slit along its bottom, said flexible piping completely enclosing the bead, the side edges of the slit being straight and in clamping engagement with the opposite sides of the tape directly adjacent the enlarged bead.

CHARNA GOULD.

REFERENCES CITED

The following references are of record in the file of this patent:

UNITED STATES PATENTS

| Number | Name | Date |
| --- | --- | --- |
| 1,958,033 | Cohn | May, 8, 1934 |
| 2,080,166 | Crowe | May 11, 1937 |